United States Patent
Kim

(10) Patent No.: US 11,465,612 B2
(45) Date of Patent: Oct. 11, 2022

(54) BACKWARD DRIVING ASSIST APPARATUS FOR VEHICLE AND METHOD OF CONTROLLING SAME

(71) Applicant: HYUNDAI MOBIS CO., LTD., Seoul (KR)

(72) Inventor: Jeong Ku Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 337 days.

(21) Appl. No.: 16/601,868

(22) Filed: Oct. 15, 2019

(65) Prior Publication Data

US 2020/0122717 A1    Apr. 23, 2020

(30) Foreign Application Priority Data

Oct. 17, 2018  (KR) .................. 10-2018-0123759

(51) Int. Cl.
| | |
|---|---|
| *G06T 7/73* | (2017.01) |
| *H04N 5/235* | (2006.01) |
| *B60W 30/09* | (2012.01) |
| *B60W 50/14* | (2020.01) |
| *G05D 1/02* | (2020.01) |
| *G08G 1/16* | (2006.01) |
| *B60W 30/06* | (2006.01) |
| *B60W 30/18* | (2012.01) |
| *B60R 11/04* | (2006.01) |
| *G06V 20/56* | (2022.01) |

(52) U.S. Cl.
CPC ............ *B60W 30/06* (2013.01); *B60R 11/04* (2013.01); *B60W 30/18036* (2013.01); *G06V 20/56* (2022.01); *B60R 2300/806* (2013.01); *B60W 2520/06* (2013.01); *B60W 2520/14* (2013.01)

(58) Field of Classification Search
None
See application file for complete search history.

(56) References Cited

FOREIGN PATENT DOCUMENTS

| | | |
|---|---|---|
| DE | 10 2015 217 555 A1 | 3/2017 |
| DE | 10 2017 200 218 A1 | 7/2018 |
| DE | 10 2017 114 605 A1 | 1/2019 |
| JP | 2002-048513 A | 2/2002 |
| JP | 2007-237930 A | 9/2007 |
| JP | 2007237930 A * | 9/2007 |
| KR | 10-2015-0077823 A | 7/2015 |
| KR | 10-2017-0016201 A | 2/2017 |

* cited by examiner

*Primary Examiner* — Adam D Tissot
*Assistant Examiner* — Laura E Linhardt
(74) *Attorney, Agent, or Firm* — NSIP Law

(57) ABSTRACT

Disclosed are a backward driving assist apparatus for a vehicle and a method of controlling the same. The backward driving assist apparatus may include a first collection unit configured to collect one or more forward image frames photographed by a camera when a vehicle moves forward and a driving route generation unit configured to estimate a moving location of the vehicle by matching a wheel pulse count measured by a vehicle speed sensor, a steering angle measured by a steering angle sensor, and a yaw rate measured by a yaw rate sensor when the vehicle moves forward and to generate a forward driving trajectory when the vehicle moves forward, as a backward driving prediction route, through matching of common feature points present in consecutive forward image frames collected by the first collection unit.

6 Claims, 4 Drawing Sheets

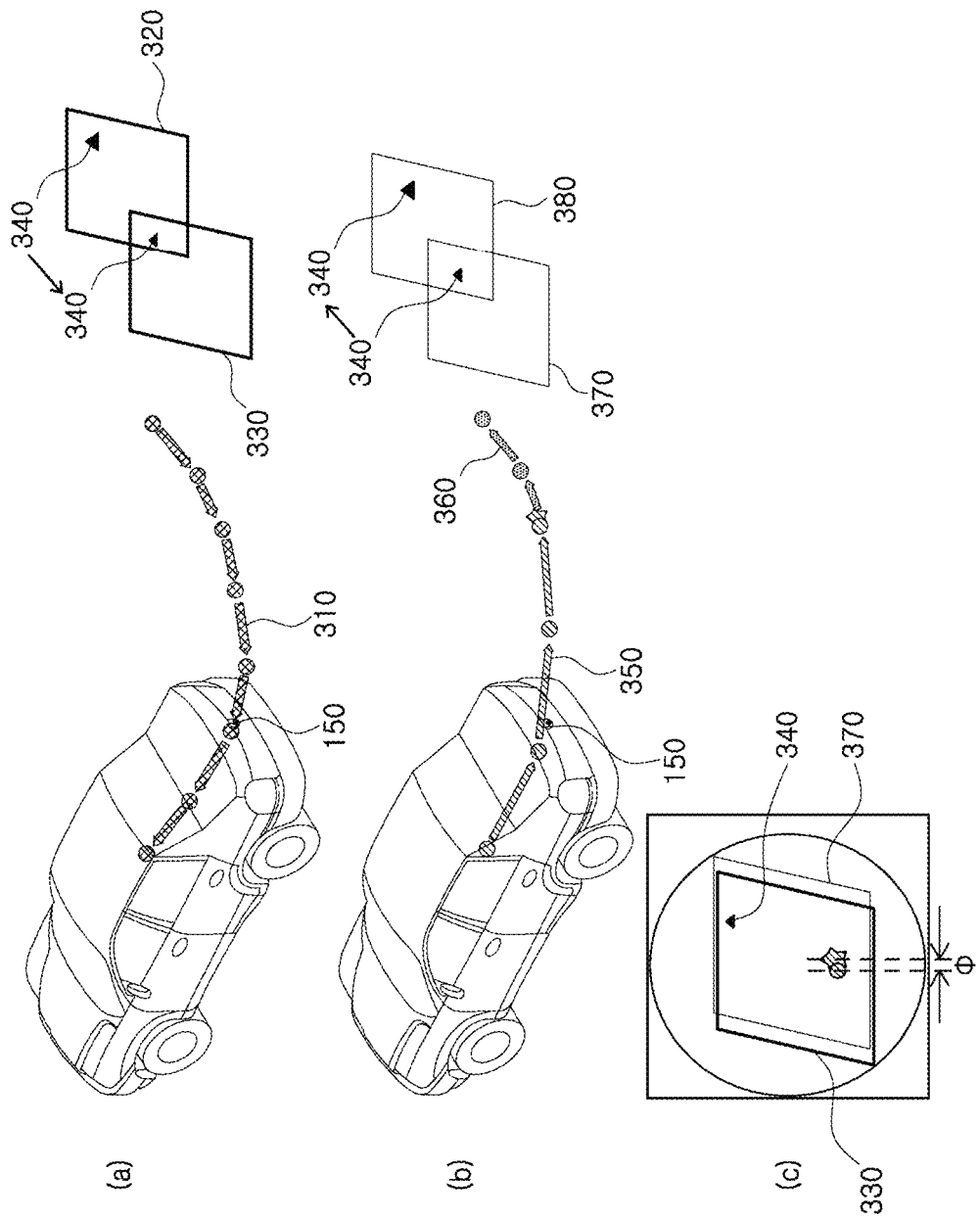

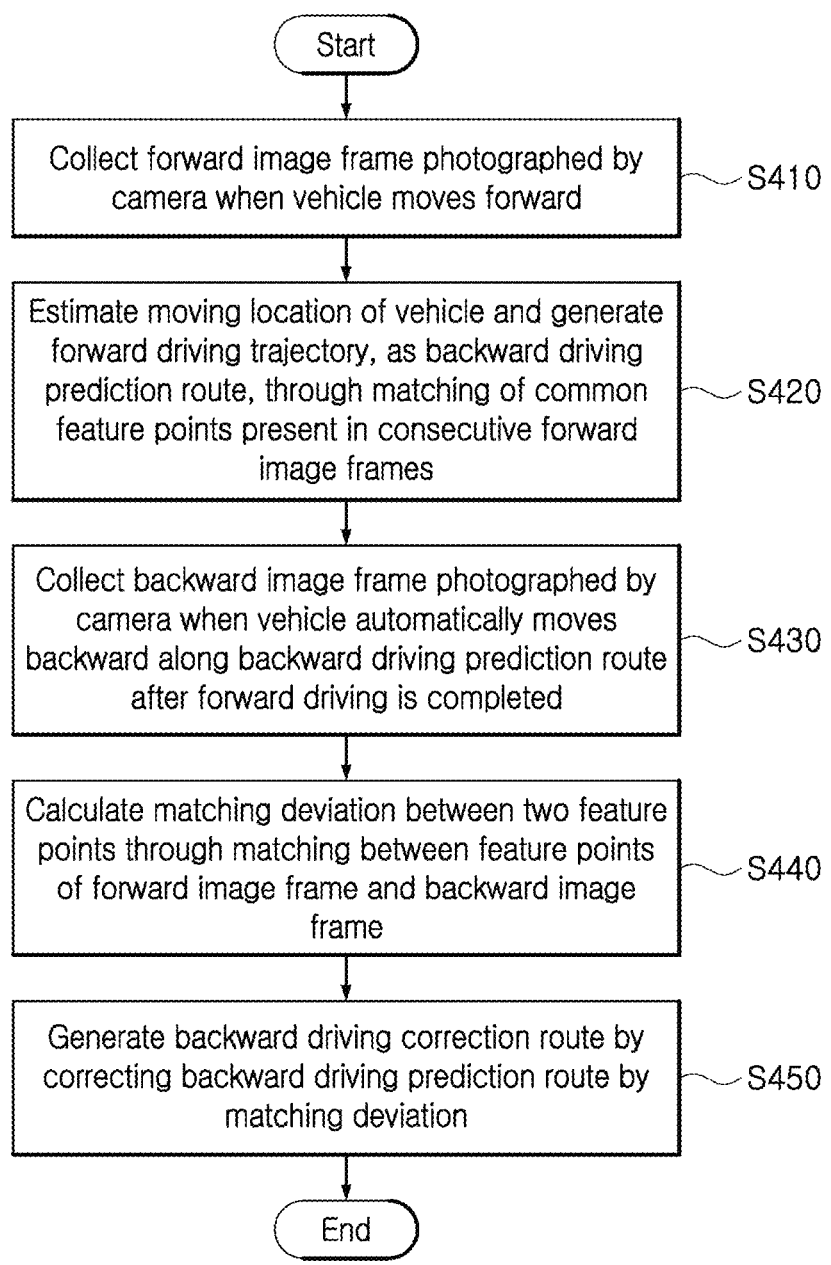

BACKWARD DRIVING ASSIST APPARATUS FOR VEHICLE AND METHOD OF CONTROLLING SAME

CROSS-REFERENCE TO RELATED APPLICATION

The present application claims priority under 35 U.S.C. § 119(a) to Korean Patent Application No. 10-2018-0123759 filed on Oct. 17, 2018 in the Korean Intellectual Property Office, which is incorporated herein by reference in its entirety.

BACKGROUND

1. Technical Field

Embodiments of the present disclosure relate to a backward driving assist apparatus for a vehicle and a method of controlling the same.

2. Related Art

In general, many drivers may have a difficulty in driving when driving a vehicle backward.

The reason for this is that the moving trajectory of the backward driving of a vehicle is different from that of the forward driving of the vehicle. Furthermore, the reason for this is that a driver must control steering while directly checking several elements, such as a rearview mirror, a side mirror and a rear camera, in order to check a backward route and an obstacle when the driver drives the vehicle backward.

For example, if a driver has to pass through, while driving a vehicle backward, a road having a narrow width or a road in which vehicles are parked or stopped on the sides of the road backward, the driver has to check the interval between obstacles, such as parked or stopped vehicles, and to drive a vehicle backward by avoiding the obstacles while directly determining whether backward driving is possible. Furthermore, a driver's skill and special attention are necessary because the driver has to drive a vehicle without being biased to any one side of the left and right on a backward route while avoiding an obstacle.

Accordingly, a backward driving assist apparatus is being developed so that a driver can drive a vehicle backward safely and conveniently. For example, apparatuses for assisting the backward driving of a vehicle include a parking assist system (PAS), a parking guide system (PGS), and a rear monitor.

The background art of the present disclosure is disclosed in Korean Patent Application Publication No. 2015-0077823 (Jul. 8, 2015 entitled "Auto Backing Route Control System for Vehicle").

The conventional auto backing route control system for a vehicle sequentially stores driving trajectory data generated when a vehicle moves forward at given distance intervals, obtains driving trajectory data in reverse order, stored when the vehicle moves forward and when the vehicle moves backward, and controls a backward route.

However, in view of the construction of the vehicle, the radius of rotation of forward driving is different from that of backward driving. Accordingly, there is a problem in that an error rate is high if a backward driving route is controlled like a forward driving route using only a vehicle speed sensor and a steering angle sensor.

The background art is technical information known by the inventor to derive the present disclosure or obtained in the process of deriving the present disclosure, and may not be said to be essentially a known technology disclosed to the public before an application for the present disclosure is filed.

SUMMARY

Various embodiments are directed to improving driving route control precision of a vehicle by correcting a backward driving route of the vehicle based on a change in the features of a forward driving image and backward driving image captured by a camera.

In an embodiment, a backward driving assist apparatus for a vehicle may include a first collection unit configured to collect one or more forward image frames photographed by a camera when a vehicle moves forward; a driving route generation unit configured to estimate a moving location of the vehicle by matching a wheel pulse count measured by a vehicle speed sensor, a steering angle measured by a steering angle sensor, and a yaw rate measured by a yaw rate sensor when the vehicle moves forward and to generate a forward driving trajectory when the vehicle moves forward, as a backward driving prediction route, through matching of common feature points present in consecutive forward image frames collected by the first collection unit; a second collection unit configured to collect one or more backward image frames photographed by the camera when the vehicle automatically moves backward along the backward driving prediction route after the forward driving of the vehicle is completed; a deviation calculation unit configured to calculate a matching deviation between two feature points through matching between a feature point of the forward image frame collected by the first collection unit and a feature point of the backward image frame collected by the second collection unit and photographed at the same location as the forward image frame; and a correction driving route generation unit configured to generate a backward driving correction route corrected from the backward driving prediction route by the matching deviation between the feature points when the vehicle automatically moves backward along the backward driving prediction route.

The first collection unit may connect a location of a feature point, included in any one of two consecutive forward image frames, and a location of a feature point included in the other of the two forward image frames using a virtual straight line and calculate a direction angle of the vehicle as an angle formed by the virtual straight line and a horizontal line of the forward image frame.

The first collection unit may exclude a moving object in a series of forward image frames photographed by the camera, from the feature point.

The second collection unit may collect the backward image frame photographed after a movement to a location corresponding to the direction angle when the vehicle automatically moves backward along the backward driving prediction route after the forward driving of the vehicle is completed.

In an embodiment, a backward driving assist method for a vehicle may include: collecting, by a first collection unit, one or more forward image frames photographed by a camera when a vehicle moves forward; estimating, by a driving route generation unit, a moving location of the vehicle by matching a wheel pulse count measured by a vehicle speed sensor, a steering angle measured by a steering angle sensor, and a yaw rate measured by a yaw rate sensor when the vehicle moves forward, and generating a forward driving trajectory when the vehicle moves forward, as a backward driving prediction route, through matching of common feature points present in consecutive forward image frames collected by the first collection unit; collecting, by a second collection unit, one or more backward image frames photographed by the camera when the vehicle automatically moves backward along the backward driving prediction route after the forward driving of the vehicle is completed; calculating, by a deviation calculation unit, a matching deviation between two feature points through matching between a feature point of the forward image frame collected by the first collection unit and a feature point of the backward image frame collected by the second collection unit and photographed at the same location the forward image frame; and generating, by a correction driving route generation unit, a backward driving correction route corrected from the backward driving prediction route by the matching deviation between the feature points when the vehicle automatically moves backward along the backward driving prediction route.

The method may further include connecting, by the first collection unit, a location of a feature point, included in any one of two consecutive forward image frames, and a location of a feature point included in the other of the two forward image frames using a virtual straight line, and calculating a direction angle of the vehicle as an angle formed by the virtual straight line and a horizontal line of the forward image frame.

The method may further include excluding, by the first collection unit, a moving object in a series of forward image frames photographed by the camera, from the feature point.

The method may further include collecting, by the second collection unit, the backward image frame photographed after a movement to a location corresponding to the direction angle when the vehicle automatically moves backward along the backward driving prediction route after the forward driving of the vehicle is completed.

Other aspects, characteristics and advantages other than the described ones will become evident from the claims and the detailed description of the disclosure.

BRIEF DESCRIPTION OF THE DRAWINGS

FIG. 3 is a diagram shown to schematically describe the generation of a backward driving correction route in the backward driving assist apparatus for a vehicle shown in FIG. 1.

FIG. 4 is a flowchart for illustrating a backward driving assist method for a vehicle according to an embodiment of the present disclosure.

DETAILED DESCRIPTION

Figure 1:
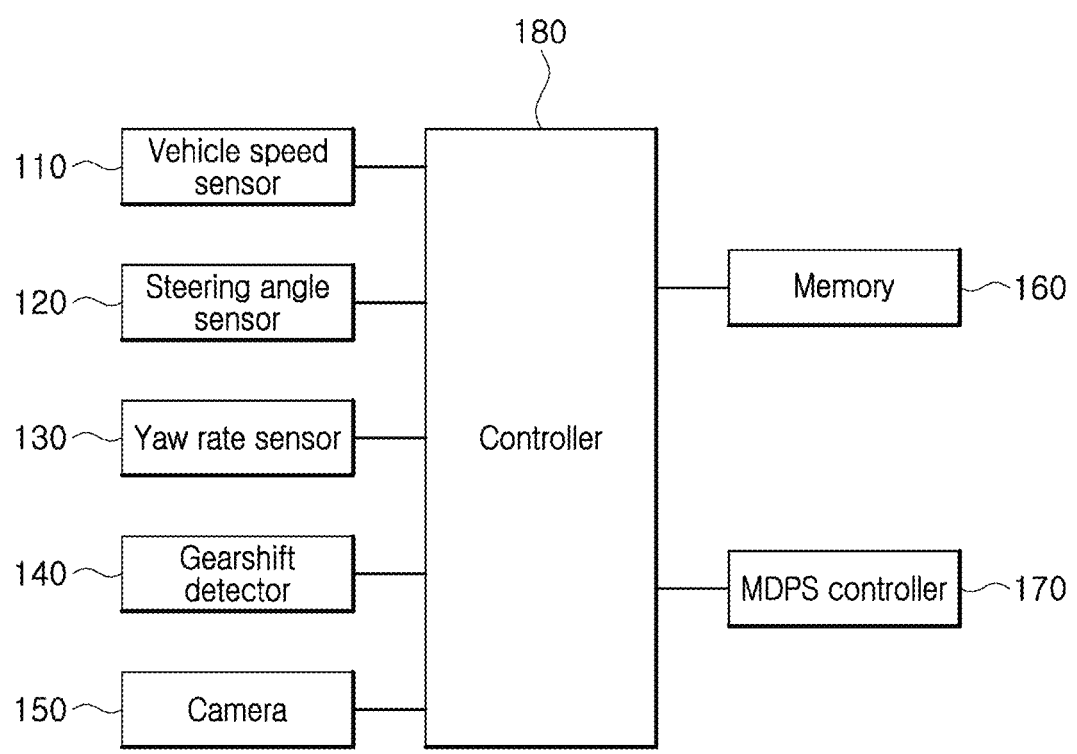
FIG. 1 is a diagram shown to schematically describe a backward driving assist apparatus for a vehicle according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

The merits and characteristics of the present disclosure and a method for achieving the merits and characteristics will become more apparent from embodiments described in detail in conjunction with the accompanying drawings. However, the present disclosure is not limited to the disclosed embodiments, but may be implemented in various different ways and should be understood to include all changes, equivalents or substitutes included in the spirit and technical range of the present disclosure. The embodiments are provided to only complete the disclosure of the disclosure and to allow those skilled in the art to fully understand the category of the disclosure. In describing the present disclosure, a detailed description of a related known technology will be omitted if it is deemed to make the gist of the present invention unnecessarily vague.

Hereinafter, embodiments of the present disclosure will be described in detail with reference to the accompanying drawings. In describing the embodiments with reference to the accompanying drawings, the same or corresponding element is assigned the same reference numeral, and a redundant description of the same or corresponding element will be omitted.

FIG. 1 is a diagram shown to schematically describe a backward driving assist apparatus 100 for a vehicle according to an embodiment of the present disclosure. Referring to FIG. 1, the backward driving assist apparatus 100 for a vehicle may include a vehicle speed sensor 110, a steering angle sensor 120, a yaw rate sensor 130, a gearshift detector 140, a camera 150, a memory 160, an MDPS controller 170, and a controller 180.

The vehicle speed sensor 110 may count a wheel pulse of a vehicle wheel and provide the wheel pulse count to the controller 180 so that it can check a vehicle speed and a moving distance.

The steering angle sensor 120 may measure a steering angle of the steering wheel of a vehicle and provide the measured steering angle to the controller 180.

The yaw rate sensor 130 may measure a yaw rate value of a tilted vehicle while the vehicle moves, and may provide the measured yaw rate value to the controller 180.

The gearshift detector 140 may detect the location of a gearshift and provide the detected location to the controller 180.

The camera 150 may be turned on to photograph (or generate) a series of image frames when a vehicle moves forward and/or when a vehicle moves backward. The camera 150 may include one or more of rear, front and side cameras 150 capable of photographing a series of forward image frames when the vehicle moves forward and photographing a series of backward image frames when the vehicle moves backward.

The camera 150 may photograph the subject for photography within a photographing area using a complementary metal-oxide semiconductor (CMOS) module or a charge coupled device (CCD) module, for example. An input image frame (or moving image) is provided to the CMOS module or the CCD module through a lens. The CMOS module or the CCD module may convert the light signal of the subject for photography passing through the lens into an electrical signal (or photographing signal), and may output the electrical signal (or photographing signal).

The camera 150 may further include an image processor (not shown). The image processor may perform image signal processing on an image frame in order to reduce noise and to improve picture quality, such as gamma correction, color filter array interpolation, a color matrix, color correction, or color enhancement. Furthermore, the image processor may functionally perform color processing, blur processing, edge enhancement processing, image interpretation processing, image recognition processing, or image effect processing. The image recognition processing may include face recognition or scene recognition processing. For example, the image recognition processing may include brightness level adjustment, color correction, contrast adjustment, contour enhancement adjustment, screen split processing, the generation of a character image and the synthesis processing of an image. The image processor may be provided in the camera 150, may be provided in the controller 180 or may be provided as a separate device.

The memory 160 may perform a function for temporarily or permanently storing data processed by the controller 180. Furthermore, the memory 160 may store an image frame photographed by the camera 150 under the control of the controller 180. Furthermore, the memory 160 may store a forward driving trajectory when a vehicle moves forward, as a backward driving prediction route, under the control of the controller 180, and may store a backward driving correction route corrected from the backward driving prediction route by a matching deviation between feature points.

The memory 160, that is, storage media, may include magnetic storage media or flash storage media, but the scope of the present disclosure is not limited thereto. The memory 160 may include internal storage media and/or external storage media. The memory 160 may include volatile storage media such as DRAM, SRAM, or SDRAM, non-volatile storage media such as one time programmable ROM (OTPROM), PROM, EPROM, EEPROM, mask ROM, flash ROM, NAND flash storage media, or NOR flash storage media, flash drives such as an SSD, a compact flash (CF) card, an SD card, a micro-SD card, a mini-SD card, an Xd card, or a memory stick, or a storage device such as an HDD.

The MDPS controller 170 may drive a driving motor (not shown) at a target steering angle when a vehicle moves forward, may assist forward driving by rotating a steering wheel (not shown), may automatically drive the driving motor according to a backward driving prediction route and/or a backward driving correction route after forward driving is completed, and may assist backward driving by rotating the steering wheel.

The controller 180 may estimate the moving location of a vehicle by matching a wheel pulse count measured by the vehicle speed sensor 110, a steering angle measured by the steering angle sensor 120, and a yaw rate measured by the yaw rate sensor 130 when the vehicle moves forward, and may generate a forward driving trajectory when a vehicle moves forward, as a backward driving prediction route, using a common feature point present in consecutive forward image frames received from the camera 150. Furthermore, the controller 180 may calculate a matching deviation between two feature points through matching between the feature point of a forward image frame and the feature point of a backward image frame received from the camera 150 and photographed at the same location as the forward image frame, and may generate a backward driving correction route corrected from a backward driving prediction route by the matching deviation between the feature points.

Figure 2:
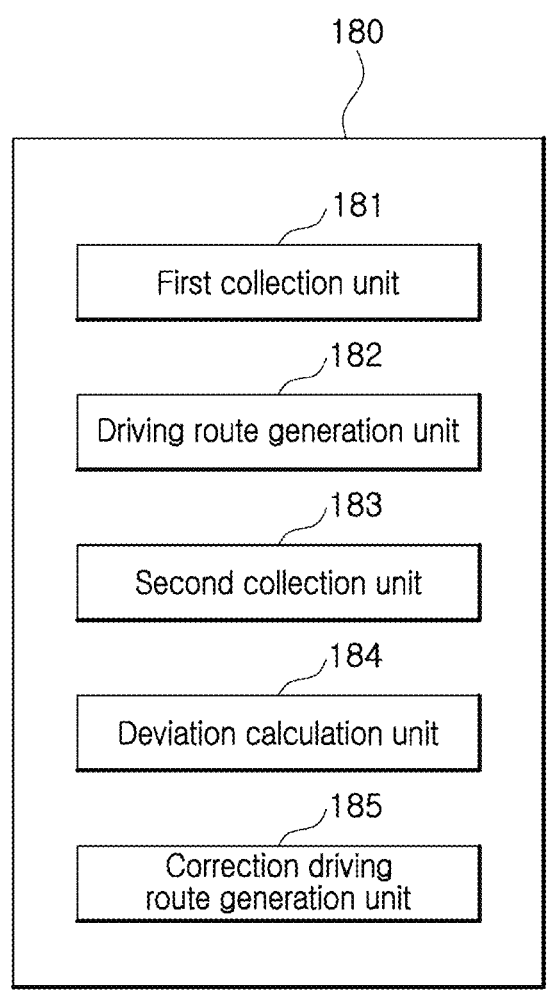
FIG. 2 is a diagram shown to schematically describe a detailed configuration of a controller in the backward driving assist apparatus for a vehicle shown in FIG. 1.

FIG. 2 is a diagram shown to schematically describe a detailed configuration of the controller in the backward driving assist apparatus for a vehicle shown in FIG. 1. FIG. 3 is a diagram shown to schematically describe the generation of a backward driving correction route in the backward driving assist apparatus for a vehicle shown in FIG. 1. Referring to FIG. 2, the controller 180 may include a first collection unit 181, a driving route generation unit 182, a second collection unit 183, a deviation calculation unit 184 and a correction driving route generation unit 185.

The first collection unit 181 may collect one or more forward image frames photographed by the camera 150 when a vehicle moves forward. In the present embodiment, the first collection unit 181 may connect the location of a feature point, included in any one of two consecutive forward image frames, and the location of a feature point included in the other of the forward image frames using a virtual straight line, and may calculate the direction angle of a vehicle as an angle formed by the virtual straight line and the horizontal line of the forward image frame. Furthermore, when the direction angle is calculated, the first collection unit 181 may exclude a moving object in a series of forward image frames photographed by the camera 150, from the feature point. This is for reducing an error occurring due to the matching between feature points when a route is generated by excluding a moving object from a feature point and using a fixed object as a feature point. In the present embodiment, the function of the first collection unit 181 for calculating the direction angle may be included in the driving route generation unit 182.

The driving route generation unit 182 may estimate the location of a vehicle through dead reckoning by matching a wheel pulse count of the vehicle speed sensor 110, a steering angle of the steering angle sensor 120, and a yaw rate value of the yaw rate sensor 130. The driving route generation unit 182 may generate a forward driving trajectory when a vehicle moves forward, as a backward driving prediction route, based on a location estimation value of a vehicle and the matching of common feature points present in consecutive forward image frames which are collected by the first collection unit 181 and to which a direction angle has been applied.

FIG. 3a illustrates a forward driving trajectory 310 (including C→B→A) generated by the driving route generation unit 182 when a vehicle moves forward. For example, the driving route generation unit 182 may generate any one point of the forward driving trajectory 310 through the matching of feature points 340 present in common in a first forward image frame 320 and a second forward image frame 330 consecutive to the first forward image frame 320. Through such a method, the driving route generation unit 182 may generate a forward driving trajectory when a vehicle moves forward through the matching of common feature points present in consecutive forward image frames, and may store the generated forward driving trajectory in the memory 160. The forward driving trajectory may be used as a backward driving route.

After the forward driving of the vehicle is completed, the second collection unit 183 may collect one or more backward image frames photographed by the camera 150 when the vehicle automatically moves backward along the backward driving prediction route stored in the memory 160.

In this case, right before the automatic backward driving, the second collection unit 183 may move the camera 150 or the vehicle at a direction angle previously calculated by the first collection unit 181, and may collect backward image frames photographed by the camera 150 while the vehicle automatically moves backward along the backward driving prediction route.

The reason for this is that if the photographing directions of a forward image frame and a backward image frame at the same location are different, images focused on the subject for photography are different and thus it is impossible to match the images. That is, in the case of a vehicle that simply moves forward and a vehicle that simply moves backward, images captured by the camera 150 at the same location may be different. Accordingly, when a forward image frame is stored in the memory 160, the location and direction of a feature point may be previously determined, and a backward image frame may be photographed by incorporating the location and direction into the backward image frame when a vehicle moves backward.

The deviation calculation unit 184 may calculate a matching deviation between two feature points through matching between the feature point of a forward image frame collected by the first collection unit 181 and the feature point of a backward image frame collected by the second collection unit 183 and photographed at the same location as the forward image frame.

FIG. 3b illustrates a backward driving prediction route 350 (including A→B→C) when a vehicle automatically moves backward after the forward driving of the vehicle is completed. For example, FIG. 3b illustrates a first backward image frame 370 to which the location and direction angle of the feature point 340 of a forward image frame have been applied and a second backward image frame 380 consecutive to the first backward image frame 370.

Referring to FIG. 3c, the deviation calculation unit 184 may determine matching between the feature points 340 by comparing the first backward image frame 370 including the feature point 340 with the second forward image frame 330 including the feature point 340 stored in the memory 160, and may calculate a matching deviation φ (e.g., lateral bias) between the feature points 340. In the present embodiment, only the contents in which a matching deviation is calculated through a comparison between one backward image frame and one forward image frame have been disclosed, but the present disclosure is not limited thereto. For example, a plurality of matching deviations may be calculated through a comparison between a series of backward image frames photographed on the backward driving prediction route 350 and a series of forward image frames stored in the memory 160.

The correction driving route generation unit 185 may generate a backward driving correction route (e.g., 360 of FIG. 3) by correcting a backward driving prediction route (e.g., 350 of FIG. 3) by a matching deviation φ between feature points when a vehicle automatically moves backward along the backward driving prediction route 350. In this case, the vehicle may move backward along the backward driving correction route 360.

As described above, driving route control precision can be improved by correcting a disturbance (e.g., slip or lateral error), occurring regardless of a road condition when a vehicle automatically moves backward, through image frame matching.

FIG. 4 is a flowchart for illustrating a backward driving assist method for a vehicle according to an embodiment of the present disclosure. In the following description, the description of a portion redundant with the description of FIGS. 1 to 3 will be omitted.

Referring to FIG. 4, at step S410, the backward driving assist apparatus 100 collects one or more forward image frames photographed by the camera 150 when a vehicle moves forward. In this case, the backward driving assist apparatus 100 may calculate a direction angle of the vehicle based on the location of a feature point included in two consecutive forward image frames in common, and may exclude a moving object in a series of forward image frames photographed by the camera 150, from the feature point when calculating the direction angle.

At step S420, the backward driving assist apparatus 100 generates a forward driving trajectory when the vehicle moves forward, as a backward driving prediction route, based on a location estimation value of the vehicle, estimated through dead reckoning by matching a wheel pulse count of the vehicle speed sensor 110, a steering angle of the steering angle sensor 120, and a yaw rate value of the yaw rate sensor 130, and matching of common feature points present in consecutive forward image frames to which the direction angle has been applied.

At step S430, the backward driving assist apparatus 100 collects one or more backward image frames photographed by the camera 150 when the vehicle automatically moves backward along the backward driving prediction route after the forward driving of the vehicle is completed. In this case, right before the automatic backward driving, after moving the camera 150 or the vehicle at the previously calculated direction angle, the backward driving assist apparatus 100 may collect backward image frames photographed by the camera 150 while the vehicle automatically moves backward along the backward driving prediction route.

At step S440, the backward driving assist apparatus 100 calculates a matching deviation between two feature points through matching between the feature point of a forward image frame and the feature point of a backward image frame photographed at the same location as the forward image frame.

At step S450, the backward driving assist apparatus 100 generates a backward driving correction route by correcting the backward driving prediction route by the matching deviation between the feature points when the vehicle automatically moves backward along the backward driving prediction route. The vehicle moves backward along the backward driving correction route 360.

According to embodiments, driving route control precision of a vehicle can be improved by correcting the backward driving route of the vehicle based on a change in the features of a forward driving image and backward driving image captured by the camera.

Effects of the present disclosure are not limited to the above-described effect, and other effects not described above may be evidently understood by those skilled in the art from the following description.

The spirit of the present disclosure should not be limited and defined by the above-described embodiments, and all changes equivalently changed from the claims and equivalent ones in addition to the claims may be said to fall within the category of the spirit of the present disclosure.

What is claimed is:

1. A backward driving assist apparatus for a vehicle, comprising:
    a processor configured to:
    collect two or more forward image frames photographed by a camera, in response to the vehicle moving forward;
    calculate a direction angle of the vehicle as an angle formed by a horizontal line of a first forward image frame, of the two or more forward image frames, and a virtual straight line connecting a location of a first feature point, included in any one of two consecutive forward image frames, and a location of a second feature point included in another of the two consecutive forward image frames;

estimate respective moving locations of the vehicle by matching a wheel pulse count measured by a vehicle speed sensor, a steering angle measured by a steering angle sensor, and a yaw rate measured by a yaw rate sensor when the vehicle moves forward; and generate a forward driving trajectory when the vehicle moves forward, as a backward driving prediction route, based on matching of common feature points present in consecutive forward image frames and the respective moving locations, wherein, for the collection of the two or more forward image frames, the processor is further configured to exclude a moving object in a series of forward image frames photographed by the camera, from feature points used for the calculation of the direction angle.

2. The backward driving assist apparatus of claim 1, wherein the processor is further configured to:

collect one or more backward image frames photographed by the camera when the vehicle automatically moves backward along the backward driving prediction route after the forward driving of the vehicle is completed;

calculate a matching deviation between two feature points by performing a matching between a feature point of a forward image frame, of the two or more forward image frames, and a feature point of a backward image frame, of the one or more backward image frames, photographed at a same location as the forward image frame; and generate a backward driving correction route corrected from the backward driving prediction route by the matching deviation, in response to the vehicle automatically moving backward along the backward driving prediction route.

3. The backward driving assist apparatus of claim 2, wherein, for the collection of the one or more backward image frames, the processor is further configured to collect the backward image frame photographed after a movement to a location corresponding to the direction angle when the vehicle automatically moves backward along the backward driving prediction route after the forward driving of the vehicle is completed.

4. A backward driving assist method for a vehicle, the method comprising:

collecting, by a processor, two or more forward image frames photographed by a camera, in response to the vehicle moving forward;

calculating a direction angle of the vehicle as an angle formed by a horizontal line of a first forward image frame, of the two or more forward image frames, and a virtual straight line connected to a location of a first feature point, included in any one of two consecutive forward image frames, and a location of a second feature point included in another of the two consecutive forward image frames;

estimating, by the processor, respective moving locations of the vehicle by matching a wheel pulse count measured by a vehicle speed sensor, a steering angle measured by a steering angle sensor, and a yaw rate measured by a yaw rate sensor when the vehicle moves forward; and generating a forward driving trajectory when the vehicle moves forward, as a backward driving prediction route, based on matching of common feature points present in consecutive forward image frames and the respective moving locations, wherein the collecting of the two or more forward image frames comprises excluding, by the processor, a moving object in a series of forward image frames photographed by the camera, from feature points used for the calculation of the direction angle.

5. The backward driving assist method of claim 4, further comprising:

collecting, by the processor, one or more backward image frames photographed by the camera when the vehicle automatically moves backward along the backward driving prediction route after the forward driving of the vehicle is completed;

calculating, by the processor, a matching deviation between two feature points by performing a matching between a feature point of a forward image frame, of the two or more forward image frames, and a feature point of a backward image frame, of the one or more backward image frames, photographed at a same location as the forward image frame; and generating, by the processor, a backward driving correction route corrected from the backward driving prediction route by the matching deviation when the vehicle automatically moves backward along the backward driving prediction route.

6. The backward driving assist method of claim 5, wherein the collecting of the one or more backward image frames comprises collecting, by the processor, the backward image frame photographed after a movement to a location corresponding to the direction angle when the vehicle automatically moves backward along the backward driving prediction route after the forward driving of the vehicle is completed.

* * * * *